United States Patent
Saito et al.

(10) Patent No.: US 6,751,833 B2
(45) Date of Patent: Jun. 22, 2004

(54) METHOD OF MANUFACTURING LAMINATED CAPACITORS

(75) Inventors: Toshiharu Saito, Osaka (JP); Motoi Kitano, Kawanishi (JP); Mutsuaki Murakami, Machida (JP)

(73) Assignee: Matsushita Electric Industrial Co., Ltd. (JP)

( * ) Notice: Subject to any disclaimer, the term of this patent is extended or adjusted under 35 U.S.C. 154(b) by 186 days.

(21) Appl. No.: 09/839,264

(22) Filed: Apr. 23, 2001

(65) Prior Publication Data

US 2001/0017758 A1 Aug. 30, 2001

Related U.S. Application Data

(62) Division of application No. 09/295,328, filed on Apr. 21, 1999, now Pat. No. 6,288,890.

(30) Foreign Application Priority Data

Apr. 21, 1998 (JP) .......................................... 10-110448
Jul. 3, 1998 (JP) .......................................... 10-188644

(51) Int. Cl.⁷ ............................. H01G 7/00; H01G 9/00
(52) U.S. Cl. ..................... 29/25.42; 29/25.41; 361/523; 361/524
(58) Field of Search ............................. 29/25.41, 25.42; 427/79–81; 361/523, 524, 525

(56) References Cited

U.S. PATENT DOCUMENTS

| | | | |
|---|---|---|---|
| 4,805,074 A | * 2/1989 | Harakawa et al. | 361/525 |
| 5,062,025 A | * 10/1991 | Verhoeven et al. | 361/509 |
| 5,119,274 A | 6/1992 | Kinuta et al. | 361/525 |
| 5,140,502 A | * 8/1992 | Kudoh et al. | 361/540 |
| 5,212,402 A | * 5/1993 | Higgins, III | 257/532 |
| 5,377,073 A | * 12/1994 | Fukaumi et al. | 361/540 |
| 5,741,599 A | 4/1998 | Oie et al. | 428/458 |

FOREIGN PATENT DOCUMENTS

| | | | | |
|---|---|---|---|---|
| JP | 63-29919 | 2/1988 | | |
| JP | 403109712 A | * 5/1991 | ............ | H01G/9/05 |
| JP | 3-203211 | 9/1991 | | |
| JP | 4-87312 | 3/1992 | | |
| JP | 4-87316 A | 3/1992 | | |
| JP | 4-87317 A | 3/1992 | | |
| JP | 7-7740 | 1/1995 | | |
| JP | 7-22068 | 3/1995 | | |
| JP | H7-63045 | 7/1995 | | |
| JP | 09104839 A | 4/1997 | | |
| JP | 09115767 A | 5/1997 | | |
| JP | 10079326 A | 3/1998 | | |

* cited by examiner

Primary Examiner—Carl J. Arbes
Assistant Examiner—Tai Van Nguyen
(74) Attorney, Agent, or Firm—Parkhurst & Wendel, L.L.P.

(57) ABSTRACT

A method of manufacturing a laminated electrolytic capacitor by forming a dielectric made of organic polymer or a composite dielectric made of organic polymer and an oxide of a conductive metal is disclosed. An insulating layer is formed on the conductor, and an electrode is formed on the dielectric layer to complete the capacitive element. Plural capacitor elements are laminated and bonded to outside connection terminals.

12 Claims, 11 Drawing Sheets

METHOD OF MANUFACTURING LAMINATED CAPACITORS

This is a Division of application Ser. No. 09/295,328 filed Apr. 21, 1999, now U.S. Pat. No. 6,288,890.

FIELD OF THE INVENTION

The present invention relates to the field of capacitors employed in electronic circuits for electric equipment, electronic equipment, and acoustic equipment.

BACKGROUND OF THE INVENTION

The demand for smaller electronic components with higher performance and reliability is continuing to grow as equipment becomes smaller, thinner, and lighter, and electrical equipment circuits become more densely packed and digitized. There is, as a result, an accelerating demand for capacitors with the characteristics of smaller size, larger capacitance, and lower impedance at high frequencies.

Capacitors with low impedance at high frequency include ceramic capacitors, which employ ceramics as their dielectrics, and film capacitors, which employ organic polymer film as their dielectrics. However, to achieve large capacitance, these types of capacitors require a larger size accompanied by a proportional increase in cost.

On the other hand, electrolytic capacitors, which employ aluminum or tantalum oxide film as their dielectrics, can achieve large capacitance with small size; however, their impedance and dielectric characteristics in the high frequency band degrade comparing with those of the aforementioned ceramic capacitors and film capacitors. Therefore, to improve their high frequency characteristics, aluminum solid electrolytic capacitors have been developed and made available in the field of aluminum electrolytic capacitors. The aluminum solid electrolytic capacitor employs as electrolyte solid materials which have higher conductivity than conventional materials, such as tetracyano quino-di-methane (TCNQ) complex and polypyrrole. Also in the field of tantalum electrolytic capacitors, polypyrrole, which has higher conductivity than manganese dioxide, is used for the cathode, and is now available on the market.

The above electrolytic capacitors have significantly improved high-frequency characteristics because the equivalent serial resistance (ESR) of capacitors is lowered by adopting highly conductive compounds as the cathode materials.

Also in the field of film capacitors, attempts have been made in recent years to make small the capacitor and increase its capacitance without losing the good dielectric characteristics of organic high polymer films. (Refer to Japanese Laid-open Patent Nos. S63-29919 and H3-203211.)

For example, the Japanese Laid-open Patent No. H4-87312 discloses a method for manufacturing a new type small film capacitor with large capacitance. Instead of forming an aluminum oxide film on a surface of etched aluminum foil having a large surface area, the new type capacitor employs a dielectric layer of polyimide film made by electrodeposition of polyamic acid solution. And over the polyimide film conductive high polymers are formed.

Furthermore, the Japanese Laid-open Patent No. H9-115767 discloses a method for manufacturing another new type of small film capacitor with a large capacitance. Instead of forming an aluminum oxide film on a surface of etched aluminum foil, this new type capacitor employs an aqueous solution containing polyacrylic acid derived resin (acrylic resin), which is amenable to industrial processes, to form a dielectric layer of thin polyacrylic acid derived resin film by means of electrodeposition, after which conductive high polymers are formed on the surface of the dielectric layer.

These inventions improve capacitance per unit volume while maintaining the high insulation characteristics, non-polar characteristics, and low dielectric loss factor (tan $\delta$) of polyimide or polyacrylic acid derived resin used as dielectrics, the advantageous properties characteristic of organic high polymer films.

However, there are two major concerns with the above conventional technologies. The first concern which the present invention aims to solve is described below.

In the Japanese Laid-open Patent No. H4-87312, an organic solvent such as dimethyl formamide (DMF) or methanol is used as the solvent for the polyamic acid salt solution. For safety reasons, application of voltage to electrodeposition solutions containing large amounts of organic solvents is not recommended. In addition, it is necessary to take into account the toxicity to the human body of these organic solvents. Moreover, since the solution costs more than water, it is not suitable for industrial mass production. Furthermore, the polyamic acid film formed by electrodeposition requires to be heat treated at above 200° C. to imidize the film.

Polyamic acid, when exposed to a high-humidity atmosphere, easily decomposes and shows low stability in storage. Accordingly, the molecular weight may deviate even when polyamic acid film is electrodeposited and then imidized by heat treatment. The durability of the film is also poor. Since the film quality is not ideal, capacitors using polyimide film created by heat treating polyamic acid electrodeposited film show deviations in dielectric characteristics. In addition, the capacitance of polyimide film drops considerably over time if voltage is continuously applied at temperatures between 80 and 200° C.

The invention disclosed in Japanese Laid-open Patent No. H9-115767 employs aqueous polyacrylic acid solution as the electrodeposition solution, which is better suitable to mass production. However, the heat resistance of the polyacrylic acid electrodeposition film thus formed is not as high as that of the polyimide film. In addition, the thickness of the film tends to become thicker than that of the polyimide film, which results in smaller initial capacitance, even if the dielectric is formed by applying the same electrodeposition voltage.

The present invention solves the above problems with conventional techniques and aims to provide a small capacitor with high productivity, non-polar characteristics, and large capacitance, and its manufacturing method by adopting a new polyimide as a dielectric material.

Next, the second concern which the present invention aims to solve is described.

In response to the demand for smaller electronic equipment and to the demand for high frequency switching power supply, attempts are being made to increase the capacitance of aluminum solid electrolytic capacitors using TCNQ complex or polypyrrole for the cathode by rolling or laminating etched aluminum foil.

If etched aluminum foil is rolled, mechanical stress is applied to the bent portions, which may damage the oxide film and degrade its electrical characteristics.

Even if the foil is laminated, the oxide film covering of the dielectrics is thin and prone to mechanical stress, risking damage to the oxide film during the lamination process, causing defects. Accordingly, it is considered difficult to laminate elements by applying pressure. As the number of laminated layers increases, the defect rate due to larger leak currents tends to increase in proportion. Therefore, it may be difficult to increase the rated voltage to achieve a large capacitance by increasing the number of laminated layers.

Other causes of the above problem include poor oxide film recovery capability of solid electrolyte such as polypyrrole, compared to liquid electrolyte, and difficulties in eliminating defects on the oxide film during anodization.

Accordingly, it may be difficult to increase capacitance by simultaneously increasing the number of laminated layers and the rated voltage for solid electrolytic capacitors that employ an oxide film dielectrics.

In addition, although the frequency characteristics of large capacitance solid electrolytic capacitors, including tantalum solid electrolytic capacitors, as mentioned above have been significantly improved by lowering their ESR, they still do not match the desirable characteristics of film capacitors. Furthermore, solid electrolytic capacitors may present problems if used in AC circuits and circuits to which reverse voltage is applied, because the oxide films of dielectrics possess polarity.

The present invention solves the above conventional problems, and provides a new type small laminated capacitor with good frequency characteristics equivalent to those of film capacitors, small leak current, non-polarity, and large capacitance. Its manufacturing method is also provided.

SUMMARY OF THE INVENTION

A capacitor of the present invention comprises dielectrics formed on the surface of a conductor with roughened surface and its opposite electrode formed on the surface of the dielectrics. The dielectrics is directly formed of polyimide using the electrodeposition method. As for the dielectric material, composite dielectrics of polycarboxylic acid derived resin and metal oxide may also be used. Another structure of the capacitor in the present invention is achieved by laminating more than one above capacitor.

A method for manufacturing the capacitor of the present invention comprises the following steps: forming a polyimide film on a conductor using a solution or dispersed solution containing polyimide as the electrodeposition solution; drying the polyimide film and heat treating it; and forming an opposite electrode on the polyimide film.

Another method for manufacturing the capacitor of the present invention comprises the steps of forming dielectrics made of an organic high polymer film or compoosite dielectrics made of organic high polymers and metal oxide on the surface of a conductor with roughened surface; forming an insulating layer on the conductor; constructing a capacitor element by forming an opposite electrode on the dielectrics; laminating more than one above capacitor elements; and forming an external connection terminal.

DESCRIPTION OF THE PREFERRED EMBODIMENTS

The present invention uses electrodepositable organic high polymers as the dielectric material of a capacitor so as to manufacture a small capacitor with large capacitance and desirable characteristics. Exemplary embodiments of the present invention are described below with reference to drawings.

First Exemplary Embodiment

Figure 1:
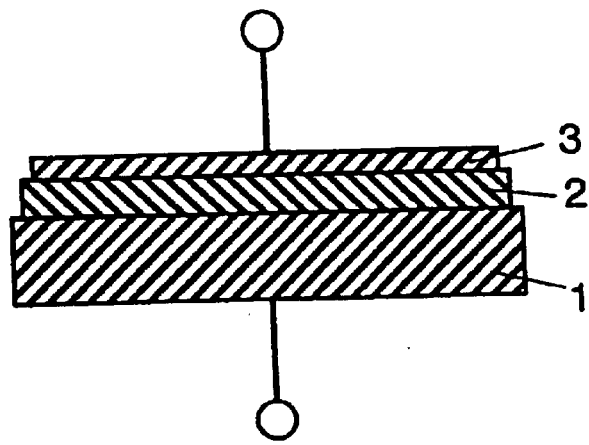
FIG. 1 a schematic sectional view of a capacitor in accordance with a first exemplary embodiment of the present invention.
Figure 2:
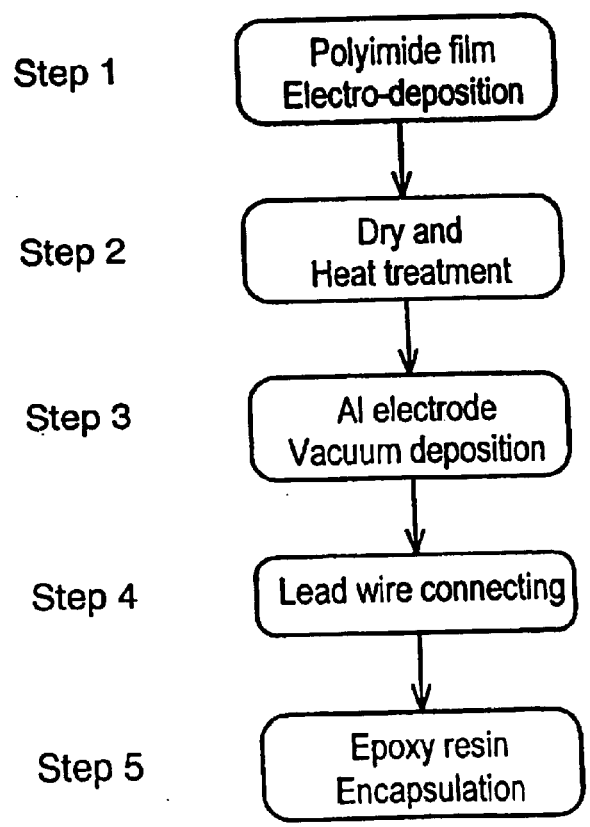
FIG. 2 a flowchart illustrating a method of manufacturing the capacitor in accordance with the first exemplary embodiment of the present invention.

FIG. 1 shows a schematic sectional view of a capacitor in a first exemplary embodiment of the present invention. FIG. 2 is a flow chart illustrating a method of manufacturing the capacitor in the first exemplary embodiment. First, the structure of the capacitor of the present invention is described in detail with reference to FIG. 1.

A polyimide film 2 is electrodeposited onto the surface of a 50 $\mu$m thick copper foil electrode 1. This polyimide film 2 is made by directly electrodepositing a imide compound. It is not formed through imidization of polyamic acid by heat treatment. Here, 'imide compound' refers to a reaction product of aromatic tetracarboxylic acid di-anhydride, aromatic diamine and aromatic diamine having at least one carboxylic radical.

Any aromatic tetracarboxylic acid di-anhydride may be used. In general, however, the following compounds are used: pyromeritic acid di-anhydride, 3,4,3',4'-benzophenone tetra-carboxylic acid di-anhydride, bis-(3,4-di-carboxy phenyl) ether anhydride, 3,4,3',4'-diphenyltetracarboxylic acid di-anhydride, and bis-(3,4-dicarboxyphenyl) ether anhydride. As an aromatic diamines having at least one carboxylic radical, any aromatic diaminocarboxylic acid may be used. In general, however, 1,3-diaminobenzoic acid, 3,5-diaminobenzoic acid, 2,4-diamino-phenyl acetic acid, and 2,5-diaminoterephthalic acid are suitable. Any type of aromatic diamine may be used. In general, however, p,m, o-phenylene diamine, 2,4-diaminotoluene, 2,4-diaminoxylene, and 2,6-diaminopyridine are used.

On the surface of the polyimide film 2, an aluminum electrode 3 is vacuum deposited as the opposite electrode. Aluminum or zinc is suitable for the electrode, but there are no limitations on the type of metal to be deposited. The opposite electrode may also be formed by plating the metal.

Next, an example of a method of manufacturing the capacitor as configured above is described in detail with reference to FIG. 2.

In Step 1, the polyimide film 2 is electrodeposited onto the copper foil electrode 1 using soluble polyimide electrodeposition solution. Polyimide in the electrodeposition solution is a reaction product of 3,4,3',4'-benzophenone tetracarboxylic acid di-anhydride, 3,5-diaminobenzoic acid, and 2,6-diaminopyridine. Polyimide is synthesized employing the method disclosed in Japanese Laid-open Patent No. H9-104839. Here, the synthesized specimen is a varnish like solution containing 20 weight % of polyimide.

The solution used for electrodeposition comprises 100 ml of the above polyimide varnish diluted with 50 ml of distilled water, 50 ml of N-methyl pyrrolidone, and 2 ml of triethylamine. This electrodeposition solution is placed in a cylindrical stainless steel vessel, which acts as the cathode, with a diameter of 80 mm. Next, the copper foil electrode 1 is immersed in the electrodeposition solution to form the anode. The area immersed is 5×20 mm. A constant 80 V is then applied between these electrodes for 15 seconds to form the polyimide film 2 on the surface of the copper foil electrode 1.

In Step 1, it is apparent that the thickness of the polyimide film 2 is adjustable by changing the applied voltage, duration of electrodeposition, and the number of electrodepositions.

In Step 2, the specimen onto which the dielectric layer is formed in Step 1 is rinsed with water, dried at 80° C. for 20 minutes, and then heat treated at 180° C. for 30 minutes to evaporate any solvent contained in the polyimide film 2 and complete the polyimide film 2. The polyimide film 2 made under these conditions is about 0.5 $\mu$m thick. An extremely thin film thickness of below 1 $\mu$m is made possible by adjusting the electrodeposition solution and electrically controlling the deposition. In other words, it is possible to create a thin film by means of electrodeposition. It may be difficult to realize such a thin film by processing a ready-made high polymer film.

In Step 3, the aluminum electrode 3 is vacuum deposited onto the surface of the polyimide film 2 formed in Step 2.

In Step 4, lead terminals are attached to both electrodes to complete a capacitor element. The finished capacitor is extremely thin, making it suitable for use in the latest thin and small electronic equipment, such as mobile phones.

Since a flexible and rollable copper foil electrode 1 is used as the electrode, a large capacitance is also achievable by creating a large area foil electrode by rolling. In this exemplary embodiment, copper foil is used for the electrode, but the use of copper foil is not obligatory. Another metal, vacuum deposited onto a high polymer film, may also be applicable. In any case, electrodeposition is an efficient method for forming dielectrics onto a large area, and it is also possible to realize thin films, making it a suitable method for increasing the capacitance of the capacitor. The manufacture of laminated capacitors can be easily achieved by repeating the formation of the electrodeposited polyimide film and vacuum deposited metal.

In Step 5, the capacitor element is encapsulated with epoxy resin to complete the capacitor in the first exemplary embodiment.

Second Exemplary Embodiment

A second exemplary embodiment of the present invention is described with reference to drawings.

Figure 3:
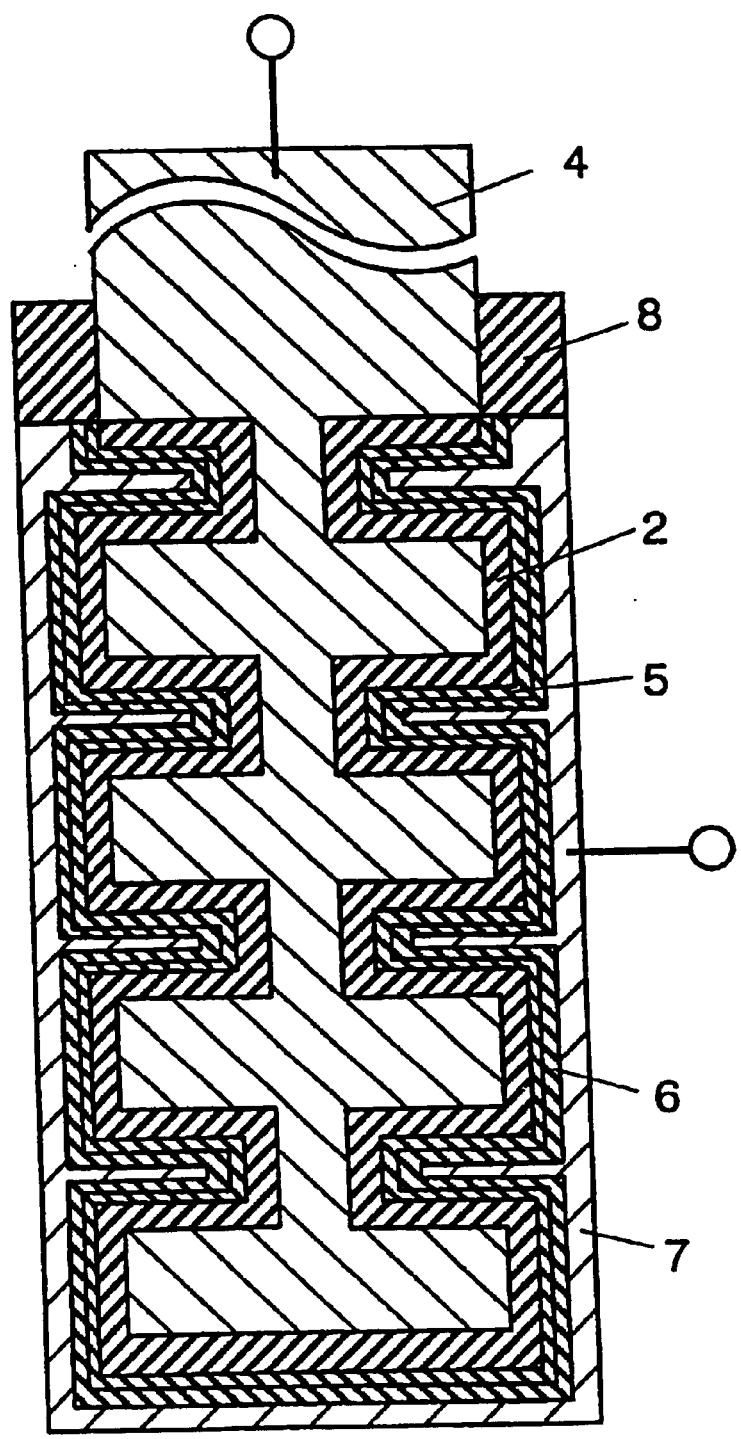
FIG. 3 a schematic sectional view of a capacitor in accordance with a second exemplary embodiment of the present invention.
Figure 4:
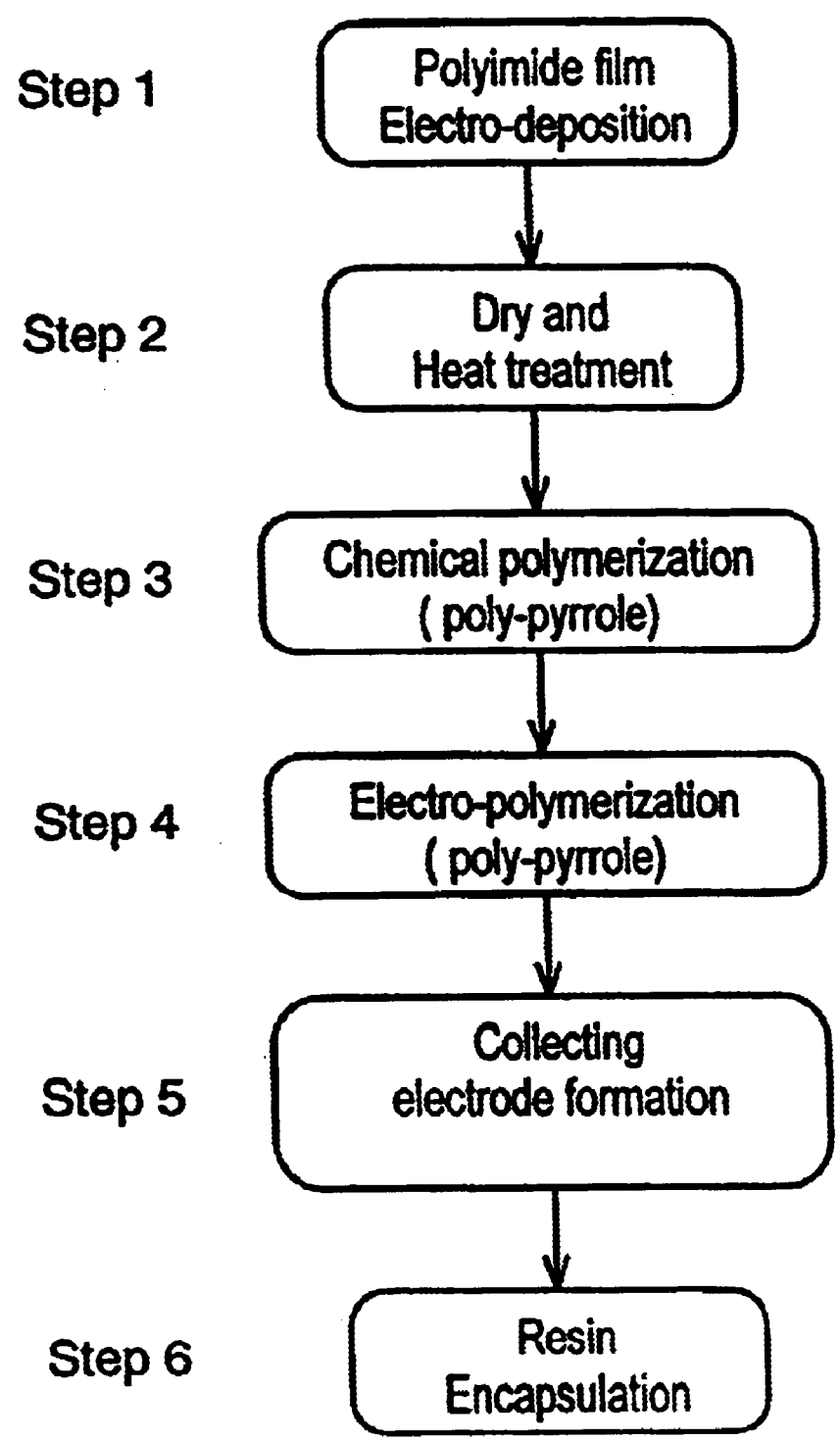
FIG. 4 a flowchart illustrating a method of manufacturing the capacitor in accordance with the second exemplary embodiment of the present invention.

FIG. 3 is a schematic sectional view of the capacitor described in this exemplary embodiment. FIG. 4 is a flow chart illustrating a method of manufacturing the capacitor in this exemplary embodiment.

First, the structure of a capacitor is described in detail with reference to FIG. 3.

An etched aluminum foil electrode 4 has an average etched fine pore diameter of 2 $\mu$m, multiplying its surface area by a factor of about 30. A dielectric polyimide film 2 which is formed by electrodeposition covers the surface of this electrode 4 following its shape.

As an opposite electrode to the etched aluminum foil electrode 4, an electrode comprising a first polypyrrole layer 5, second polypyrrole layer 6, and a collecting electrode layer 7 for collecting the current is formed. Epoxy resin 8 is applied as insulation between the electrodes. The capacitor in this exemplary embodiment is completed by connecting lead wires to two electrodes as shown in this figure, and finally encapsulating the capacitor with epoxy resin.

Next, a method of manufacturing a capacitor in this exemplary embodiment is described with reference to FIG. 4.

In Step 1, the polyimide film 2 is electrodeposited onto the etched aluminum foil electrode 4 using soluble polyimide electrodeposition solution. The electrodeposition solution used here is the same as that in the first exemplary embodiment.

The electrodeposition solution is poured into a cylindrical stainless steel vessel, which acts as the cathode, with a diameter of 80 mm. Then, the etched aluminum foil electrode 4 to which a lead is welded is immersed in the electrodeposition solution to form the anode.

A constant 40 V is applied between both electrodes for 1 minute to form the dielectric polyimide film 2 onto the surface of the etched aluminum foil electrode 4.

It is apparent that the thickness of the polyimide film 2 is adjustable by changing the applied voltage, the duration of electrodeposition, and the number of electrodepositions.

In Step 2, the specimen onto which the dielectric layer is formed is rinsed, dried at 80° C. for 20 minutes, and then heat treated at 180° C. for 30 minutes to evaporate the solvent in the polyimide film 2 to complete the polyimide film 2.

In Step 3, the element is immersed alternately for 2 minutes each in ethanol solution containing 1.0 mol/l pyrrole and 1.0 mol/l ammonium persulfate aqueous solution three times to form the first polypyrrole layer 5 made of chemically oxypolymerized polypyrrole film.

Then, in Step 4, the element onto which the first polypyrrole layer 5 is formed is immersed in a solution in a cylindrical stainless steel vessel. This solution is made by mixing 1 part of pyrrole, 1 part of solution containing 40 weight percentage of sodium salt of butyl naphthalene sulphonic acid, and 40 parts of distilled water. An external electrode is applied to the polypyrrole layer 5 to make it act as the anode, and the cylindrical stainless steel vessel acts as the cathode. Constant current with a current density of 2.5 mA/cm$^2$ is applied between electrodes to execute electrolytic polymerization for 30 minutes to form a second polypyrrole layer 6.

In Step 5, a conductive material such as colloidal carbon and silver paste is applied to this element to form the collecting electrode layer 7. This completes the opposite electrode consisting of the collecting electrode layer 7, first polypyrrole layer 5, and second polypyrrole layer 6. A lead is attached to the opposite electrode by silver paste or soldering.

Finally, in Step 6, the element is encapsulated with epoxy resin to complete the capacitor in the second exemplary embodiment.

<Performance Study 1>

Table 1 shows the initial dielectric characteristics of the capacitors made in accordance with the first and second exemplary embodiments. As shown in Table 1, tan δ of the capacitor in the first and second exemplary embodiments is smaller than tan δ of the electrolytic capacitor, demonstrating extremely good characteristics. These excellent dielectric characteristics are achieved by forming polyimide film having good quality as dielectrics.

The capacitor in the second exemplary embodiment has polyimide formed on the etched and enlarged surface area aluminum foil. Polypyrrole which has high conductivity is further formed on that surface, achieving small size but large capacitance, and a low tan δ of below 0.01.

Figure 5:
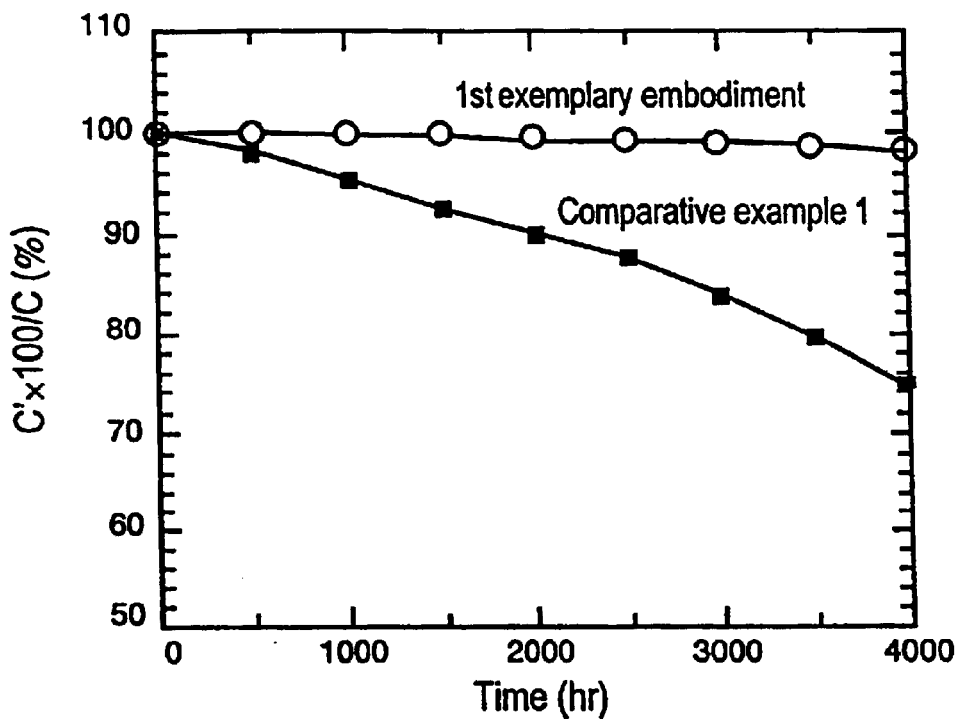
FIG. 5 a graph illustrating the capacitance change of the capacitor in accordance with the first exemplary embodiment of the present invention.
Figure 6:
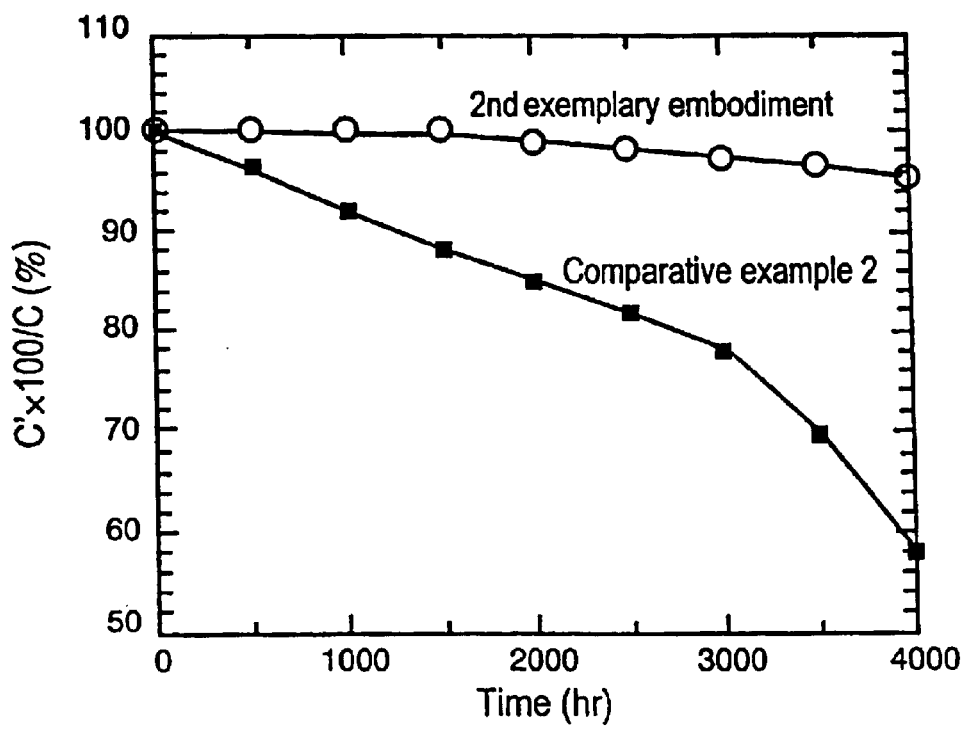
FIG. 6 a graph illustrating the capacitance change of the capacitor in accordance with the second exemplary embodiment of the present invention.

FIGS. 5 and 6 show data on changes in capacitance of the capacitor in the first and second exemplary embodiments and comparison samples when a constant voltage is applied at 105° C. In FIG. 5, 30 V and in FIG. 6, 10 V is applied.

The comparison sample is made based on capacitors manufactured using the same method as the first and second exemplary embodiments, except for the use of a conventional polyamic acid electrodeposition solution. Sample capacitors which have almost the same initial capacitance C are used for comparison. Their capacitance C' after a specified time has elapsed is plotted along the Y-axis. The capacitance of the capacitors made using conventional polyamic acid electrodeposition solution falls as time passes. This is assumed to occur due to decomposition and degradation of the dielectric polyimide film formed by heat treatment of a conventional polyamic acid film. The reason for this rapid decomposition and degradation is that, as mentioned above, the polyamic acid in the solution is not stable, and significant decomposition has already begun, resulting in the presence of a much amount of low molecular weight substances. In a similar experiment using more samples, a comparison showed the same tendency as seen in FIGS. 5 and 6.

It is apparent from FIGS. 5 and 6 that the capacitors in the first and second exemplary embodiments have less capacitance change over an extended period, assuring stable characteristics. Accordingly, the capacitors in the first and second exemplary embodiments are not easily hydrolized, enabling the electrodeposition of polyimide having a constant molecular weight. This allows the formation of a dielectric film stable for an extended period, and also reduces any degradation in characteristics.

Third Exemplary Embodiment

Figure 7:
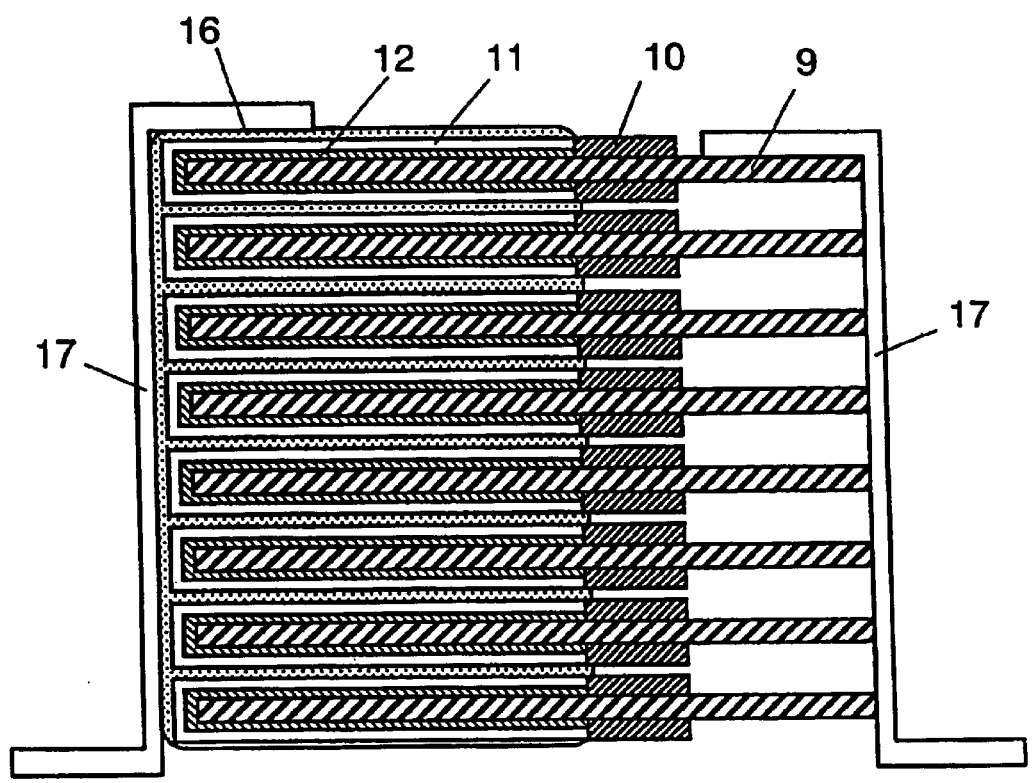
FIG. 7 a cross sectional model of a laminated capacitor in accordance with a third exemplary embodiment of the present invention.
Figure 8:
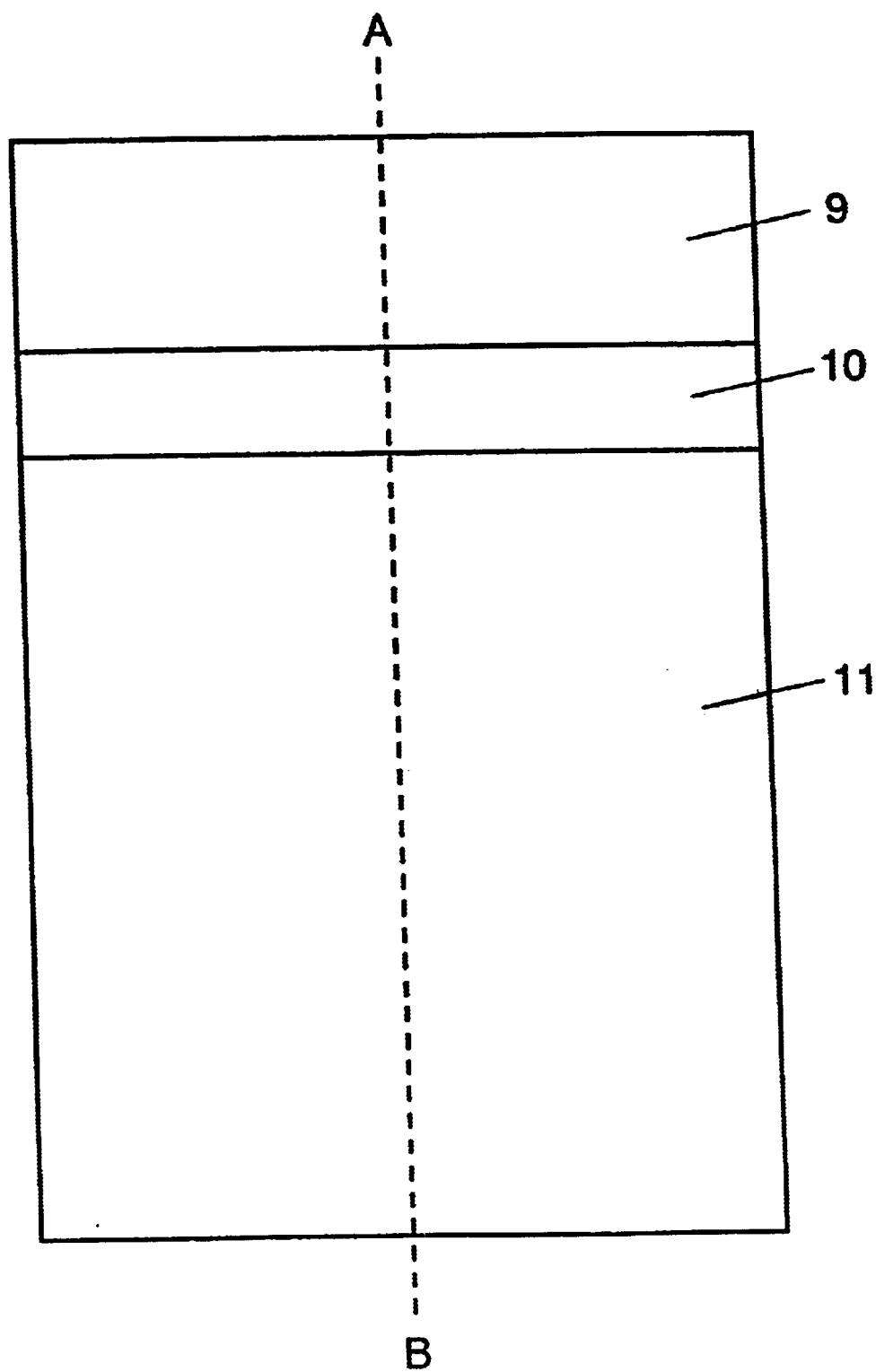
FIG. 8 a schematic plan view of a capacitor element comprising the laminated capacitor in accordance with the third exemplary embodiment of the present invention.
Figure 9:
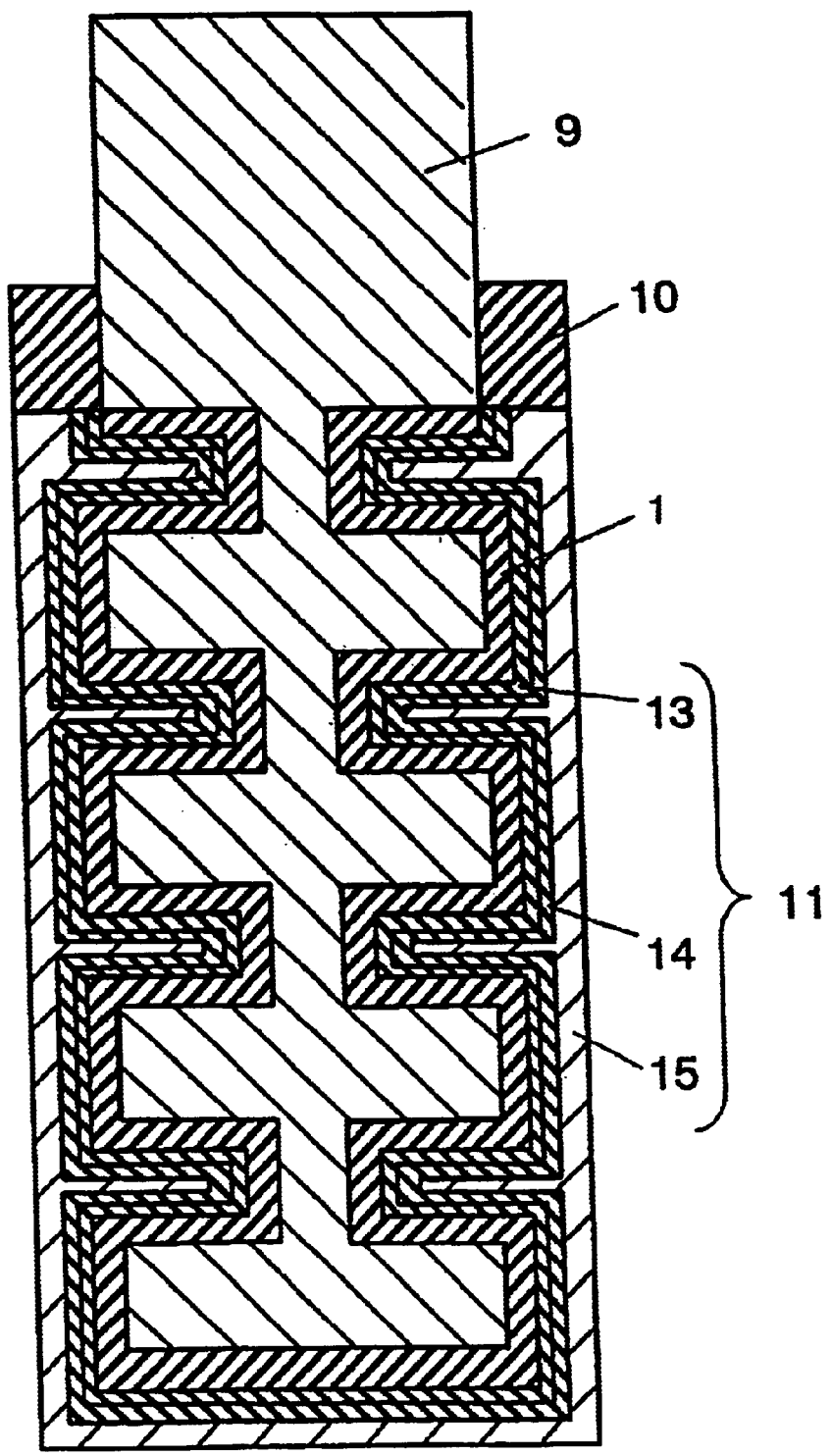
FIG. 9 a schematic cross sectional view of a capacitor element constituting the laminated capacitor in accordance with the third exemplary embodiment of the present invention.

FIG. 7 is a cross sectional view of a laminated capacitor in a third exemplary embodiment. FIGS. 8 and 9 are schematic top and cross sectional views of a capacitor element constituting the laminated capacitor.

First, the structure of one capacitor element constituting the laminated capacitor is described in detail in accordance with FIGS. 8 and 9. FIG. 9 is a schematic cross sectional view taken along the line A-B in FIG. 8.

An etched aluminum foil 9 is a conductor electrode whose surface area is enlarged by a factor of about 30 by forming fine pores with an average diameter of 2 μm by etching. A polyacrylic acid derived resin film 12, a dielectric layer of organic high polymer film, is formed by means of electrodeposition which covers the surface following the surface shape of this etched aluminum foil 9. A conductor layer 11 is formed as the opposite electrode on the surface of the polyacrylic acid derived resin film 12. An insulating layer 10 is then provided to prevent electrical contact between the etched aluminum foil 9 and the conductor layer 11, the opposite electrode, formed on the surface of the polyacrylic acid derived resin film 12.

Here, polyacrylic acid derived resin means resin having at least one carboxylic radical in its main or side chains of high polymer: namely, acrylic acid, methacrylic acid, and their esterified copolymers. Esterified copolymers, and polyacrylic acid derived resin copolymerized with polymers which do not have polar groups, such as polyethylene, polypropylene, and polystyrene show good insulation performance and dielectric characteristics. These high polymer materials are therefore suitable for use in the present invention.

A resin in which amino resin hardener such as melamine resin or benzoguanamine resin is blended is suitable for the present invention. Such resins undergo a cross-linking reaction by condensation polymerization during heat treatment, with a concomitant increase in insulation performance, heat resistance, and strength.

High polymer materials which contain carboxylic radicals, such as polyamic acid, in soluble form, and which are converted into polyimides by heat treatment are also suitable for use in the present invention. Solutions in which polyimides containing carboxylic radicals are dissolved while maintaining the structure of the polyimide as described in the first and second exemplary embodiments are also suitable for use in the present invention. (e.g. Japanese Laid-open Patent No. H9-10489.)

The conductor layer 11 which is the opposite electrode of the etched aluminum foil 9 comprises conductive high polymer layers of a first polypyrrole layer 13 and second polypyrrole layer 14, and a graphite layer 15 as seen in FIG. 9.

Next, the structure of the laminated capacitor in this exemplary embodiment is described with reference to FIG. 7.

FIG. 7 is a cross sectional view of a laminated capacitor in which eight sheets of capacitor elements shown in FIGS. 8 and 9 are laminated in the same direction. In FIG. 7, the conductor layers, which are the opposite electrodes of the eight capacitor elements, are bonded by a conductive adhesive such as Ag paste. Etched aluminum foils are also bonded to connect them electrically.

Figure 10:
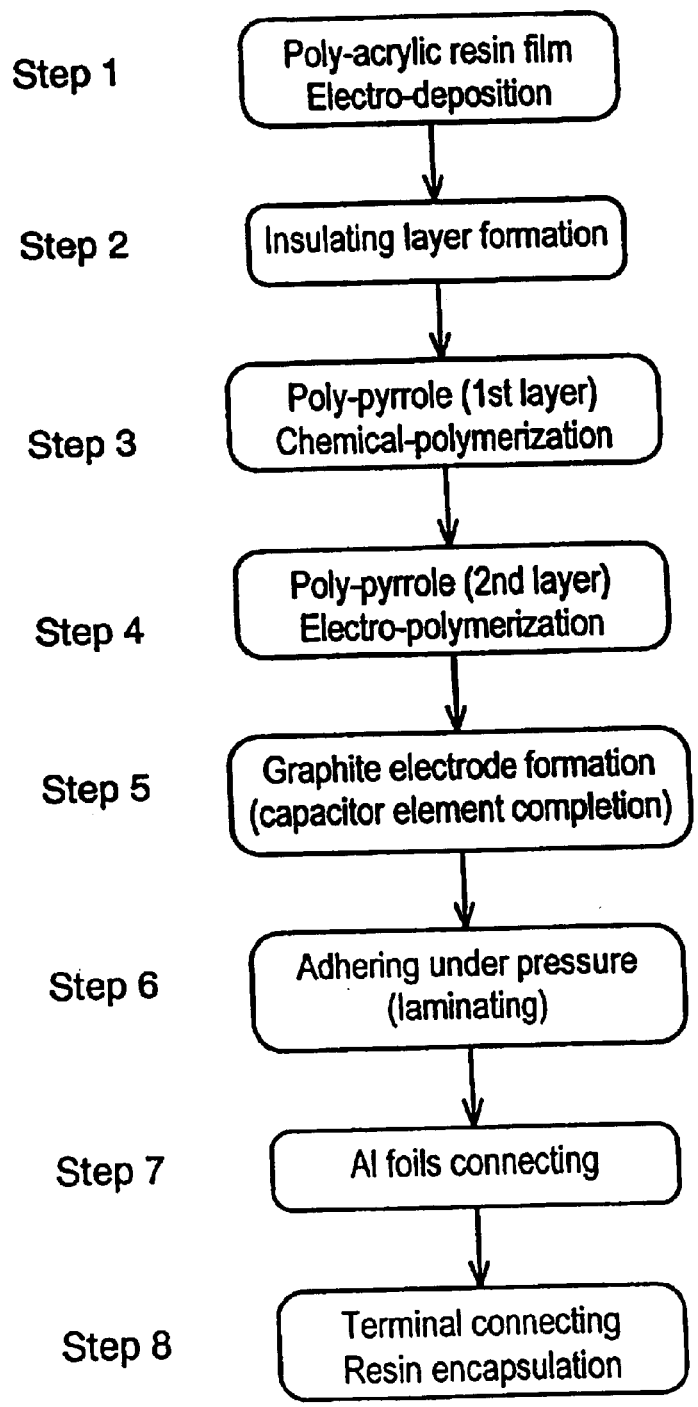
FIG. 10 a flow chart illustrating a method of manufacturing the laminated capacitor in the third exemplary embodiment of the present invention.

Next, an example of a method of manufacturing the laminated capacitor as configured above is described in detail with reference to the flow chart in FIG. 10.

First, the electrodeposition solution used is described. In the electrodeposition solution used in this exemplary embodiment, the main agent, polyacrylic acid derived resin and the curing agent, benzoguanamine resin, are dispersed in the form of a micelle structure. When the micelle diameter was measured using the dynamic scattering method, its average diameter was shown to be about 0.05 μm.

Constituents of the above aqueous electrodeposition solution are: 10 weight % of solid resin, 86 weight % of water purified by ion exchange, and 4 weight % of butyl cellosolve. The solid resin comprises a mixture in which the copolymer of acrylic acid, methacrylic acid, and styrene (molecular weight: about 30,000), and the benzoguanamine curing agent are mixed in a weight ratio of 7:3. For dispersing the above resin in the solution, an appropriate amount of triethyl amine is added to neutralize about 50% of the carboxylic acid in the solid, as is often used in the anion electrodeposition method, to improve dispersability and electrodeposition efficiency. The pH level of this electrodeposition solution was 8.2, and its conductivity was $6.1 \times 10^{-4}$ Scm$^{-1}$.

The electrodeposition solution used for the present invention is not limited to the above mixture. It is apparent that a wide range of solutions containing electrodepositable high polymer are applicable. Even commercially available polycarboxylic anion electrodeposition solution can be applied for the purpose of the present invention after adjusting the mixing ratio. Polymers to be electrodeposited are also not limited to anionic types. Cationic electrodeposited high polymer film can be formed by using a conductor with roughened surface as a cathode. In other words, any high polymer which can be electrophoresized in solution, and which solidifies on the conductor electrode surface, is applicable.

Next, Step 1 is described. First, the electrodeposition solution is poured into a cylindrical stainless steel vessel with a diameter of 80 mm, which acts as the cathode. Then, the etched aluminum foil 9 cut into a piece 9 mm×5 mm in size is immersed in the electrodeposition solution to act as the anode. The area immersed is 5×5 mm. The etched aluminum foil 9 used for electrodeposition is previously electro-cleaned using alkali solution to remove the natural oxide film on the surface and make the surface uniform. Before applying voltage, any air remaining in the fine pores of the etched aluminum foil 9 is degassed under reduced pressure to ensure that all the fine pores are completely filled with electrodeposition solution.

Next, electrodeposition is executed by applying a constant current and constant voltage for 15 minutes at a current density of 0.3 mA/cm$^2$. The electrodepositing voltage is set to 10 V to form polyacrylic acid derived resin on the surface of the etched aluminum foil 9. Electrodeposition at a constant current and voltage involves first performing electrodeposition at constant current. The electrodeposition voltage increases with increasing film resistance and levels off at the set voltage. Electrodeposition is then switched to constant voltage mode.

After rinsing the etched aluminum foil 9, onto which polyacrylic acid derived resin has been formed, it is dried at 80° C. for 20 minutes and then heat treated at 180° C. for 30 minutes to initiate the cross-linking reaction between the benzoguanamine resin and the polyacrylic acid derived resin.

The above-mentioned electrodeposition and heat treatment are repeated three times. The set electrodeposition voltage is increased in steps of 20 V, 30 V, and 40 V. This makes it possible to manufacture an element with a dielectric layer comprised of polyacrylic acid derived resin film 12 with good heat resistance and insulation performance.

In Step 1, the thickness of the polyacrylic acid derived resin film 12 is adjustable by changing current density, set voltage, and the duration of electrodeposition.

In Step 2, an insulating layer 10 is added to prevent any electrical contact between the etched aluminum foil 9 and the conductor layer 11 formed on the surface of the dielectric layer. UV-cured resin is used for this insulating layer 10. As shown in FIG. 8, the insulating layer 10 is formed on a 1 mm wide portion of the dielectric layer closing the top end. This UV-cured resin is thinly provided around the etched aluminum foil 9 as shown in FIG. 8.

The insulating layer 10 used in this exemplary embodiment is not limited to the above material. Any material with insulation performance and good adhesion is applicable. Namely, epoxy adhesives and adhesive high polymer film tapes are applicable.

In Step 3, chemical oxydization polymerization of polypyrrole is executed by immersing the above specimen in 1) ethanol solution containing 1.0 mol/l pyrrole and 2) aqueous solution containing 1.0 mol/l of ammonium persulfate alternately for two minutes each for three times to form the first polypyrrole layer 13 on the dielectric layer.

In Step 4, the element, onto which the first polypyrrole layer 13 is formed, is immersed in a cylindrical stainless vessel containing a mixed solution of one part of pyrrole, one part of 40 weight percent aqueous solution of the sodium salt of butyl naphthalene sulphonic acid as a supporting electrolyte, and 40 parts of distilled water. An external electrode is applied to the first polypyrrole layer 13 to function as the anode, and the stainless container functions as the cathode. A constant current at a current density of 2.5 mA/cm$^2$ is applied between the electrodes for 30 minutes to form the second polypyrrole layer 14.

In Steps 3 and 4 of this exemplary embodiment, polypyrrole formed by chemical oxidation polymerization and electrolytic polymerization is employed as the conductor layer 11. However, the material is not limited to polypyrrole in the present invention. It is apparent that other pai-electron conjugated conductive polymers, such as polypyrrole derivatives to which alkyl groups have been introduced, and polythiophene derivatives such as polyethylene dioxythiophene are applicable. Polypyrrole or polyethylene dioxythiophenes which have high conductivity and heat resistance is preferable.

The formation method of conductive polymer is also not limited to that described in this exemplary embodiment. A conductive polymer layer may be formed on the surface of the dielectric layer only by a chemical oxydation polymerization. Negative ions used for doping the conductive polymer, such as sulphonic acid ions, are also not limited to those used in the first exemplary embodiment. In general, any dopant used for increasing the conductivity of the conductive high polymer is suitable for the present invention.

In Step 5, colloidal graphite is applied to the surface of the second polypyrrole layer 14 to form the graphite layer 15 which functions as the collecting electrode. This completes the conductor layer 11 comprising the graphite layer 15, first polypyrrole layer 13, and second polypyrrole layer 14. The capacitor element is now complete.

In Step 5, a conductive adhesive layer such as Ag paste may be formed on the surface of the graphite layer 15.

Steps 1 to 5 were executed on 40 pieces of the etched aluminum foil 9 in total to complete 40 capacitor elements with the same area. The capacitance of each capacitor element was 0.4 μF (120 Hz) on average, and tan δ was 0.65% (120 Hz) on average.

Next, in Step 6, eight pieces of capacitor element are laminated together by applying a pressure of 2 kgf/cm² and using Ag paste 16 as the conductive adhesive. Since multiple capacitor elements are attached together under pressure, the gaps between the capacitor elements will be small, so that only a small quantity of the conductive adhesive 16 is required, allowing the laminated capacitor to be made even thinner.

In Step 7, eight adjacent pieces of etched aluminum foil 9 are connected by welding. (The connecting details are not illustrated in FIG. 7 because FIG. 7 is a model of the laminated capacitor.) The bonding method for etched aluminum foils in the present invention is not limited to the method described in the third exemplary embodiment. As long as electrical resistance is not increased, bonding by welding, flame-splaying, or conductive adhesive may be adopted. In addition, the same or a different type of conductor may be placed in the gap between the adjacent etched aluminum foil pieces 9, onto which the conductor layer 11 is not formed, before connecting by welding.

Lastly, in Step 8, a terminal electrode 17 is bonded to the conductor layer 11 with a conductive adhesive 16, and another terminal electrode 17 is bonded to the etched aluminum foil 9 by welding. The specimen is then encapsulated with epoxy resin, completing the laminated capacitor in the third exemplary embodiment.

By following Steps 6 to 8, five laminated capacitors comprising eight capacitor elements having organic high polymer film dielectric layers were manufactured.

Table 2 shows the characteristics of the five laminated capacitors made in the third exemplary embodiment: capacitance at 120 Hz, tan δ at 120 Hz, ESR at 100 kHz, and leak current at plus minus 5V.

For comparison, the characteristics of the laminated aluminum solid electrolytic capacitor are shown in Table 2 as Comparison 1. In Comparison 1, the etched aluminum foil was anodized at 90° C. in a 3 weight % of ammonium adipate solution, and multiple capacitor elements provided with polypyrrole as opposite electrodes were laminated to form a laminated aluminum solid electrolytic capacitor. In Comparison 1, the current density for forming a dielectric by anodization was set to the same value as that in the first exemplary embodiment. Anodization voltage was increased in steps of 10 V, 20 V, 30 V, and 40 V with an intermediate heat treatment process. The heat treatment temperature for the anodized film was set to be 480° C. The apparent area of one side of the etched aluminum foil onto which the dielectrics is formed was 3 mm×4 mm. Except for the process to form dielectrics by anodization, the same procedures from Steps 2 to 8 as in the third exemplary embodiment were implemented to laminate five capacitor elements each, to manufacture five laminated capacitors in total. Comparison 1 shows the capacitance at 120 Hz, tan δ at 120 Hz, ESR at 100 kHz, and average leak current when applying plus minus 5V.

Table 2 shows that capacitance in the third exemplary embodiment increases in proportion to the increase in number of capacitor elements. Although capacitor elements are laminated, tan δ remains low and the same value as that of a single capacitor element. ESR is also extremely low. For 5V, leak current is small, showing no dependence on polarity. Here, leak current traveling from the aluminum foil to dielectrics is defined as positive. Low leak current and no polarity confirm the advantage of making dielectrics from organic polymer film.

In Comparison 1, mechanical stress due to friction during lamination has damaged the aluminum oxide film dielectric layer, causing a large leak current. Average tan δ of Comparison 1 exceeded that of the third exemplary embodiment. The absolute value of leak current is also larger than in the third exemplary embodiment, and polarity was even more marked.

When comparing the ESR of the third exemplary embodiment and that of Comparison 1, the laminated capacitor in the third exemplary embodiment showed a lower value. There are two probable causes for this difference despite the presence of the conductor layer 11. One is that the contact resistance is different due to the difference in the dielectric material in spite of using the same conductive polymers. Another possible cause is that the dielectrics itself has a different ESR. Since the conductor layer 11 and dielectric layer 13 are both made of organic substances in the third exemplary embodiment, the contact at the boundary face of these two layers has better adhesion than in Comparison 1, thus resulting in lower contact resistance. Organic high polymer film in the third exemplary embodiment has a lower ESR than aluminum anodized film does.

Accordingly, the laminated capacitor in the third exemplary embodiment has lower contact resistance between the dielectric layer and the conductive high polymer layer, and lower ESR than the laminated Comparison 1 capacitor in Table 2 because the ESR of the dielectrics is lower than that of the oxide film.

Figure 11:
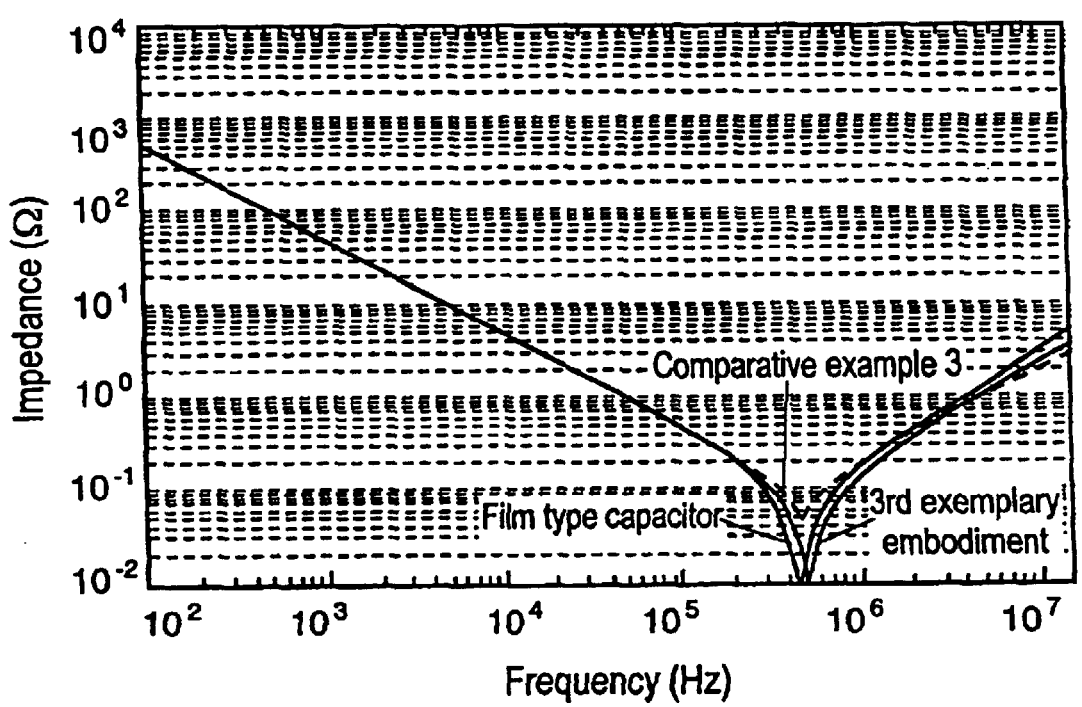
FIG. 11 the frequency characteristics of the impedance of the laminated capacitor in accordance with the third exemplary embodiment of the present invention.

FIG. 11 shows an example of impedance frequency characteristics of the laminated capacitor achieved in this exemplary embodiment. In the figure, results for commercially available polyester film capacitor of 3.3 μF and the 3.3 μF aluminum solid electrolytic capacitor using polypyrrole as the cathode made in Comparison 1 are also shown.

Looking at FIG. 11, the capacitor in the third exemplary embodiment can be seen to have good impedance characteristics, equivalent to those of polyester film capacitors. Furthermore, the laminated capacitor in the third exemplary embodiment has ⅓₀th the volume of the polyester film capacitor. Accordingly, the laminated capacitor in the third exemplary embodiment is smaller but has a larger capacitance than conventional film capacitors. This was made possible by employing roughened electrodes in the capacitor elements and laminated multiple capacitor elements.

The third exemplary embodiment enables a large capacitance to be achieved by laminating multiple capacitor elements without risking damage to the dielectric layer. This is done by configuring the laminated capacitor as multiple capacitor elements in which the conductor layer is formed on the surface of the dielectric layer made of an organic polymer film formed on a surface-roughened etched aluminum foil.

This prevents damage to the dielectric film even when pressure is applied during lamination. Many capacitor elements may be built up in layers, and a laminated capacitor with good characteristics is achieved by using organic polymer film for the dielectric layer.

Organic polymer film has better elasticity, flexibility, and slidablity than aluminum oxide film. Accordingly, it has better resistance to mechanical stress than aluminum oxidized film. Therefore, the dielectric may not be damaged even if many elements are laminated under pressure.

Aluminum oxidized film is harder than organic polymer film, but also more fragile. Accordingly, aluminum oxide film on the surface of etched aluminum foil with a complicated surface shape may cause leak current due to the cracking as a result of mechanical stress. This increases the defect rate when manufacturing a great number of capacitors.

By adopting an organic polymer film for the dielectric layer, as in the third exemplary embodiment, a laminated capacitor with a low defect rate, good frequency characteristics, and large capacitance can be manufactured.

Since the conductor layer is mainly constituted of the conductive high polymer layer, its conductivity is extremely high, and it has good adhesion with the organic polymer constituting the dielectric layer. This achieves lower contact resistance at the boundary face, and thus lower ESR.

Since the conductive high polymer layer is made of polypyrrole formed by the combination of chemical polymerization and electrolytic polymerization, the laminated capacitor having the conductor layer with good thermal stability and high conductivity is achieved.

Since the conductor layer is made of a conductive polymer layer and graphite layer, ESR is extremely small.

In the capacitor of this exemplary embodiment, multiple capacitor elements are laminated in the same directions, and conductor layers of adjacent capacitor elements are adhered to by conductive adhesive, and bonded so that electrodes with roughened surface area are also electrically conductive. Multiple capacitor elements are electrically connected in parallel. This achieves a laminated capacitor with large capacitance.

By providing an insulating layer for preventing electrical contact of the conductor with roughened surface and the conductor layer formed on the surface of the dielectric layer, multiple capacitor elements can be easily connected in parallel without the risk of electrical contact between capacitor elements.

Since organic polymer film 12 is formed by electrodeposition, it covers the roughened surface of the conductor electrode evenly, making it more resistant to mechanical stress as well as having the advantage of not possessing polarity.

Since the dielectric film used in the capacitor is a polyacrylic acid resin film formed by electro-deposition, it shows good adhesion with etched aluminum foil, strong mechanical stress, and good insulation characteristics.

The method of manufacturing the laminated capacitor in the third exemplary embodiment comprises the steps of forming an organic high polymer dielectric layer onto a specified portion of the roughened surface of the conductor electrode; forming an insulating layer to prevent electrical contact between the conductor electrode and the conductor layer; completing the capacitor laminated by forming the conductor layer on the surface of the dielectric layer; laminating multiple capacitor elements and adhering adjacent conductor layers by conductive adhesive; bonding adjacent conductor electrodes with roughened surface area to ensure electrical contact; and providing terminal electrodes. This allows the lamination of multiple capacitor elements without damaging the dielectric layer, resulting in feasible manufacture of a small laminated capacitor with good characteristics and large capacitance.

Since the electro-deposition method is employed in the step of forming the dielectric layer of organic high polymer film, the conductor with roughened surface area is uniformly covered. This enables the efficient formation of a dielectric layer which is resistant to mechanical stress.

Organic high polymer used for forming the above dielectric layer is made of polyacrylic acid resin film which is a typical polycarboxylic acid resin. This enables its efficient solidification by electro-deposition, to form a non-polar dielectric layer with good heat resistance and insulation characteristics.

In the step of completing the capacitor element by forming the conductor layer on the surface of the dielectric layer, a conductive high polymer layer made of highly conductive polypyrrole is formed by a combination of chemical oxidation polymerization and electro-polymerization. This enables the manufacture of a low ESR laminated capacitor.

In the step of laminating multiple capacitor elements and adhering conductor layers with conductive adhesive, adjacent conductor layers are adhered by applying the appropriate pressure of 2 kgf/cm$^2$. This facilitates industrial manufacturing, and also achieves a thinner laminated capacitor.

Fourth Exemplary Embodiment.

In a fourth exemplary embodiment of the present invention, conductive high polymer layer employed for the conductor layer in Steps 3 and 4 of the third exemplary embodiment is changed to polyethylene dioxythiophene. Other than this, the same method as the third exemplary embodiment is employed for the manufacture of five eight-layer laminated capacitors in total. Type and concentration of dopant used in forming polyethylene dioxythiophene are the same as the third exemplary embodiment.

Table 2 shows capacitance at 120 Hz, tan δ at 120 Hz, ESR at 100 kHz, and average leak current at a plus minus 5V of five laminated capacitors obtained in the fourth exemplary embodiment.

As shown in Table 2, the fourth exemplary embodiment also achieves good effects same as the third exemplary embodiment. In other words, non-polar laminated capacitor with large capacitance, low tan δ, low ESR, and small leak current is manufactured.

In the fourth exemplary embodiment, the reason that low ESR is achieved even the type of conductive high polymer has been changed is because of high conductivity of polyethylene dioxythiophene.

Fifth Exemplary Embodiment

A fifth exemplary embodiment of the present invention is described with reference to drawings.

Figure 12:
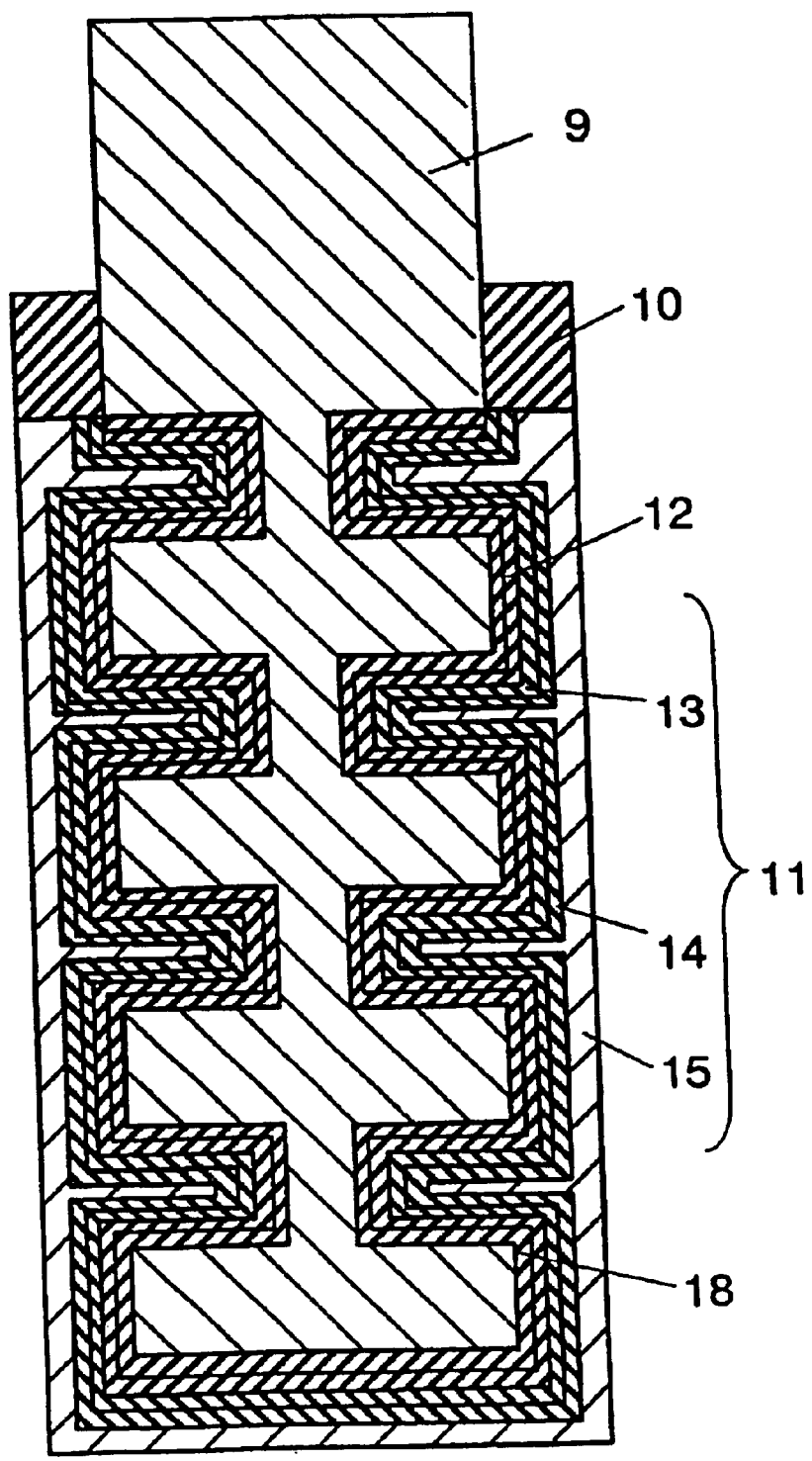
FIG. 12 a schematic sectional view of a capacitor element constituting the laminated capacitor in a fifth exemplary embodiment of the present invention.

FIG. 12 is a schematic sectional view of one capacitor element constituting a laminated capacitor described in this exemplary embodiment.

First, the structure of one capacitor element constituting the laminated capacitor is described in details with reference to FIGS. 8 and 12. FIG. 12 is a schematic sectional view taken along the Line A-B in FIG. 8, same as that in the third exemplary embodiment.

In FIG. 12, a compound dielectric layer, a dielectric layer of organic high polymer film, comprising a polyacrylic acid derived resin film 12 and an aluminum oxide film 18, is formed by means of electro-deposition and anodization which covers the surface following the surface shape of an etched aluminum foil 9. A conductor layer 11 is further formed on the surface of the composite dielectric layer. Then, an insulating layer 10 is provided on the surface of the composite dielectric layer to prevent any electrical contact between the etched aluminum foil 9 and conductor layer 11.

The conductor layer 11 comprises a first polypyrrole layer 13 and second polypyrrole layer 14 which are conductive polymers, and graphite layer 15.

The capacitor element in the fifth exemplary embodiment as described above only differs with that of the third exemplary embodiment by the structure for the dielectric layer. In other words, when multiple capacitor elements in the fifth exemplary embodiment are laminated, the laminated capacitor having the structure shown in FIG. 7 is also achieved.

Figure 13:
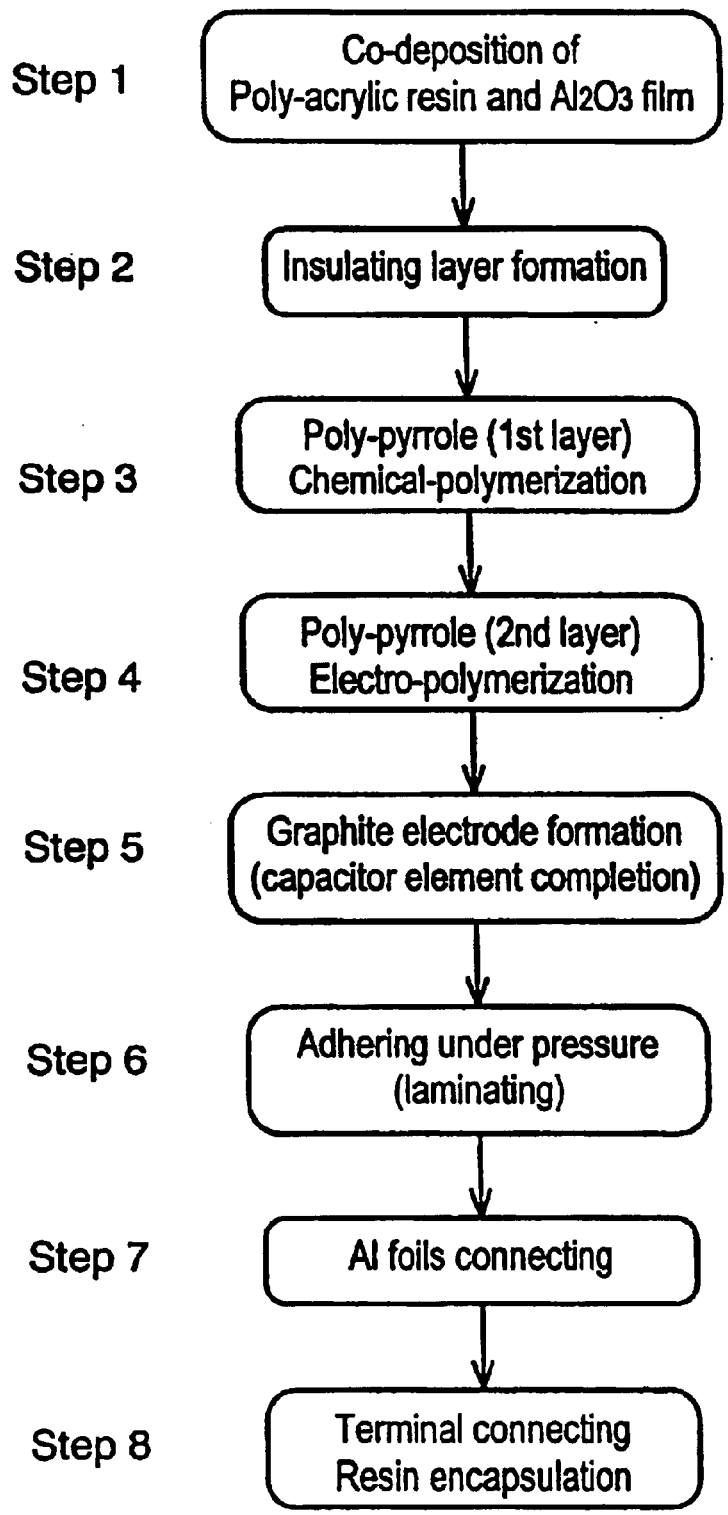
FIG. 13 a flow chart illustrating a method for manufacturing the laminated capacitor in accordance with the fifth exemplary embodiment of the present invention.

Next, an example of a method for manufacturing the laminated capacitor with the above structure is described in details with reference to a flow chart in FIG. 13.

First, solutions to be used for electro-deposition and anodization are described first. In the solution, the main agent of polyacrylic acid derived resin and curing agent of benzoguanamine resin are dispersed in the form of a micelle structure. When the micelle diameter was measured using the dynamic scattering method, its average diameter was shown to be about 0.05 μm.

Constituents of the above solution are: 10 weight % of solid resin, 60 weight % of ion exchange water, 46 weight % of N-methyl pyrrolidone, and 4 weight % of butyl cellosolve. Same as in the third exemplary embodiment, the solid resin comprises a mixture in which copolymer of acrylic acid, methacrylic acid, and styrene (molecular weight: about 30,000) (main agent) and benzoguanamine resin (curing agent) are mixed in a weight ratio of 7:3. For dispersing the above resin in the solution, an appropriate amount of triethylamine is added to neutralize 50% of the carboxylic acid in the solid, as is often used in the anion electrodeposition method, and improve dispersability and electro-deposition efficiency. The pH level of this solution was 7.8, and its conductivity was 1.6×10−4 Scm−1. N-methyl pyrrolidone added has a function to increase fusion of copolymers for electro-deposition, and suppress formation of a high polymer film in the electro-deposition solution.

Next, Step 1 is described. First, the above solution is poured into a cylindrical stainless steel vessel, which acts as the cathode, with a diameter of 80 mm. Then, the etched aluminum foil 9 cut into a piece 9 mm×5 mm in size is immersed in the solution to act as the anode. The area immersed is 5×5 mm. The etched aluminum foil 9 used in this step is previously electro-cleaned using alkali solution to remove the natural oxide film on the surface and make the surface uniform. Before applying voltage, any air remaining in the fine pores of the etched aluminum foil 9 is degassed under reduced pressure to ensure that all the fine pores are completely filled with solution.

Next, the current is applied according to the constant current method at a current density of 0.2 mA/cm². After reaching a target voltage of 10V, voltage is continued to be applied at the constant voltage until total time of applying current and voltage reaches 30 minutes. This enables to form the polyacrylic acid derived resin film 12 and aluminum oxide film 18 simultaneously on the surface of the etched aluminum foil 9.

How the above phenomenon is achieved is described next. On the electrode of the etched aluminum foil 9, which is anode, deposition of a high polymer film by neutralization of carboxylic acid ion containing high polymers and hydrogen ion generated by electrolysis of water, and oxidization of aluminum compete. In this solution, a normal electrode potential of aluminum is as low as −1.66V compared to the normal hydrogen electrode potential. Accordingly, oxidization of aluminum is likely to occur thermodynamically. N-methyl pyrrolidone which occupies as large percentage as 46 weight % in the solution has strong capacity to dissolve polymers for electro-deposition as mentioned above so that it suppresses formation of a polymer film. Therefore, in the fifth exemplary embodiment, speed of forming the polymer film is slowed down. Under these conditions, an oxide film formed by anodization propagates at the same time as the polymer film is formed.

After rinsing the etched aluminum foil 9 onto which the insulating film is formed by the above treatment, the specimen is dried at 80-C for 20 minutes, and then heat treated at 180-C for 30 minutes to cure polyacrylic acid derived resin with benzoguanamine resin.

The above electro-deposition, anodization, and heat treatment are repeated three times. Set voltage is increased in steps of 20 V, 30 V and 40 V. This makes it possible to manufacture an element with a composite dielectric layer comprised of polyacrylic acid derived resin film 12 and aluminum oxide film 18 with good heat resistance and insulation performance.

Only aluminum of the above composite dielectric layer is dissolved with a bromine-methanol solution to observe a cross section of the composite dielectric layer with a scanning electronic microscope (SEM). As a result, the polyacrylic acid derived rein film 12 and aluminum oxide film 18 are formed at a film thickness ratio of 1:3. The aluminum oxide film in the amorphous phase, but a dense film was formed.

In Step 1, the thickness of the polyacrylic acid derived resin film 12 and aluminum oxide film 18 is adjustable by changing the solution mixing ratio, current density, set voltage, and duration of electro-deposition.

A method for forming the composite dielectric layer of the present invention is not limited to the method described in the fifth exemplary embodiment. An organic high polymer film may be electro-deposited onto an aluminum foil which is previously anodized. Solution containing organic acid salt or inorganic salt effective for anodizing, such as ammonium adipate, mixed with high polymers for electro-deposition as described in the third exemplary embodiment may be used for electro-deposition and anodization.

Next, 40 sheets of capacitor elements are completed same as Steps 2 to 5 in the third exemplary embodiment. Average capacitance of one capacitor element is 0.8 μF, and average tan δ is 0.80%. Same as Steps 6 to 8 in the third exemplary embodiment, eight capacitor elements are laminated each to complete five laminated capacitor having composite dielectrics consisting of the polyacrylic acid derived resin film 12 and aluminum oxide film 18.

Table 2 shows capacitance of five laminated capacitors at 120 Hz, tan δ at 120 Hz, ESR at 100 Hz, and average leak current at applying plus minus 5V voltage.

The capacitor in the fifth exemplary embodiment contains aluminum oxide film which has higher dielectric constant than the organic high polymer film in its dielectrics. Accordingly, its capacitance is larger than the laminated capacitor in the third exemplary embodiment. Although many capacitor elements are laminated, tan δ does not change compared to that of a single capacitor element. ESR and leak current are also extremely low. Almost no polarity dependence was shown in the range of 5V, reflecting the properties of the organic high polymer film.

In the fifth exemplary embodiment, the composite dielectric layer consisting of the organic high polymer film and the oxide film of the conductor electrode is formed on a specified portion of a roughened surface of the conductor electrode, and then multiple capacitor elements, on which the conductor layer is formed on the surface of the composite dielectric layer, are laminated. This enables to increase dielectric constant compared to the dielectric layer made only of the organic high polymer film. In addition, as shown in Table 2, small leak current proves that multiple capacitor elements are laminated without damaging the dielectrics. Accordingly, the laminated capacitor with large capacitance and low leak current is realized.

The manufacturing of the laminated capacitor consisting of many capacitor elements having good characteristics was made possible without damaging the dielectric film, although pressure is applied during lamination, because not only the aluminum oxide film but also organic high polymer film is contained in the dielectric layer.

As in the fifth exemplary embodiment, if the organic high polymer film exists on the face of the conductor layer 11 in the compound dielectric layer, elasticity and strength increases compared to the aluminum oxide film. Accordingly, the capacitor in the fifth exemplary embodiment showed stronger resistance to mechanical stress than the dielectric layer made only of the aluminum oxide film.

With this method, the number of lamination in a capacitor having the dielectric layer mainly made of an oxide film may be increased compared to conventional capacitors, and thus capacitors with further larger capacitance and higher pressure resistance may be manufactured. The present invention may thus be applied to the field of aluminum solid electrolytic capacitors.

In addition, since the conductor layer is formed mainly of the conductive high polymer layer, its conductivity is extremely high, and adhesion with the organic high polymer film constituting the dielectric layer is good. Accordingly, a contact resistance at the boundary surface becomes low and ESR remains low, same as in the third exemplary embodiment.

Since the conductive high polymer layer is formed by polypyrrole using both chemical oxidation polymerization and electro-polymerization, a laminated capacitor having the conductor layer with high conductivity and good heat stability is achievable.

Since the conductor layer is formed of the conductive high polymer layer and graphite layer, ESR became extremely small.

Multiple capacitor elements are aligned in the same directions for lamination, and the conductor layers acting as opposite electrodes to adjacent capacitor elements are bonded by the conductive adhesive, and then conductor electrodes themselves are bonded to achieve electrical contact so that multiple capacitor elements are electrically connected in parallel. This enables to achieve the laminated capacitor with large capacitance.

The insulating layer is provided to prevent any electrical contact between the surface-roughened conductor and the conductor layer formed on the dielectric layer. This facilitates parallel connection of multiple capacitor elements without electrical contact between capacitor elements.

The method of manufacturing the laminated capacitor in the fifth exemplary embodiment comprises the steps of forming the compound dielectric layer consisting of the organic polymer film and the oxide film of the conductor electrode at a specified area of the surface-roughened conductor electrode; forming the insulating layer for preventing any electrical contact between the surface-roughened conductor electrode and the conductor layer; completing the capacitor element by forming the conductor layer on the dielectric layer surface; laminating multiple capacitor elements and bonding adjacent conductor electrodes with conductive adhesive; bonding adjacent surface-roughened conductor electrodes to achieve electrical contact; and providing the terminal electrode. This enables to increase dielectric constant of the dielectric layer compared to the dielectric layer formed only of the organic polymer film, realizing the manufacture of a small laminated capacitor with large capacitance made by laminating multiple capacitor elements without damaging the dielectric layer.

In the step of forming the compound dielectric layer consisting of the organic polymer film and the oxide film of the conductor, both electro-deposition method and anodization method are employed. This enables to form the compound dielectric layer with good insulation performance by covering the surface-roughened conductor layer uniformly.

The organic high polymer film used in forming the above dielectric layer is a polyacrylic acid derived resin film which is a typical polycarboxylic acid resin. This allows to efficiently solidify by the electro-deposition method. Thus, the non-polar dielectric layer with good heat resistance, insulation performance, and resistance to mechanical stress is achieved.

In the step of forming the conductor layer on the dielectric layer surface to complete the capacitor element, both chemical oxidation polymerization and electro-polymerization are employed for forming the conductive high polymer layer made of polypyrrole, which has high conductivity. This enables to manufacture the laminated capacitor with low ESR.

In the step of laminating multiple capacitor elements and bonding adjacent conductor layers with conductive adhesive, adjacent conductor layers are bonded by applying an appropriate pressure of 2 $kgf/cm^2$. This facilitates industrial manufacturing, and also achieves a thinner laminated capacitor.

The third to fifth exemplary embodiments refer to the laminated capacitor made by laminating multiple capacitor elements and electrically connecting them in parallel. However, the present invention is not limited to the lamination method described in these exemplary embodiments. For example, capacitor elements may be aligned alternately to laminate conductor layers so as to electrically connect them in series. Furthermore, the laminated capacitor may be electrically connected in series and parallel alternately against one capacitor element.

As described above, the capacitor of the present invention has the dielectric layer formed mainly of organic high polymer, which has good insulation performance, long stability, and strength to mechanical stress, on the surface of the metal with enlarged surface by etching. Since the dielectric layer is formed by electro-deposition, the dielectric layer is uniformly formed to the end of each fine pore. This enables to make the dielectrics layer thinner, realizing formation of the capacitor with large capacitance. Since an anodized film is formed on the metal surface at the same time of electro-deposition, dielectric constant of the dielectric layer is further increased.

The capacitor of the present invention adopts the conductor layer comprising conductive high polymers and graphite for the opposite electrode. This decreases equivalent series resistance, making the capacitor of the present invention suitable for the electrical equipment using high frequencies.

Furthermore, the method for manufacturing the capacitor of the present invention allows to laminate many capacitor elements without damaging dielectrics or electrodes even many capacitor elements are laminated. This facilitates the manufacture of the laminated capacitor with large capacitance, low loss, low leak current, and good yield rate.

Since the conductor electrode is made of a metal foil, it can be rolled in forming capacitors, thus facilitating the manufacture of capacitors with large capacitance.

TABLE 1

|  | Capacitance (120 Hz) | Tan δ (120 Hz) |
|---|---|---|
| First preferred embodiment | 5.6 nF | 0.003 |
| Second preferred embodiment | 2.2 μF | 0.004 |

TABLE 2

|  | Capacitance | Tan δ | ESR | Leak current | |
|---|---|---|---|---|---|
|  | (120 Hz) | (120 Hz) | (100 KHz) | +5 V | −5 V |
| 3rd embodiment | 3.2 μF | 0.68% | 28 mohm | 2.1 nA | 2.2 nA |
| 4th embodiment | 3.5 μF | 0.73% | 33 mohm | 4.3 nA | 3.9 nA |
| 5th embodiment | 6.4 μF | 0.82% | 38 mohm | 3.1 nA | 5.1 nA |
| Comparison 1 | 3.3 μF | 3.3% | 87 mohm | 130 nA | 9700 nA |

What is claimed is:

1. A method of manufacturing laminated capacitors, said method comprising the steps of:

forming one of dielectrics made of organic polymer and composite dielectrics made of organic high polymer and oxide of a metal comprising a conductor;

forming an insulating layer at least on conductor;

forming an opposite electrode on said dielectrics to complete a capacitor element;

laminating together a plurality of said capacitor elements; and forming an external connection terminal.

2. The method of manufacturing the laminated capacitors as defined in claim 1, wherein said dielectrics is formed by electro-depositing organic polymer.

3. The method of manufacturing laminated capacitors as defined in claim 1, wherein said composite dielectrics is formed by simultaneously electrodepositing organic polymer and anodizing a metal comprising said conductor.

4. The method of manufacturing laminated capacitors as defined in claim 1, wherein said opposite electrode is formed by chemical oxy-polymerization or both chemical oxy-polymerization and electro-polymerization.

5. The method of manufacturing laminated capacitors as defined in claim 1, wherein said opposite electrodes of said adjacent capacitor elements are bonded using conductive adhesive during laminating a plurality of said capacitor elements.

6. The method of manufacturing laminated capacitors as defined in claim 1, wherein pressure is applied during bonding using said conductive adhesive.

7. The method of manufacturing laminated capacitors as defined in claim 2, wherein said organic polymer is selected from the group consisting of electro-deposited polyimide of electro-deposited polyimide and electro-deposited polycarboxylic acid resin.

8. The method of manufacturing laminated capacitors as defined in claim 1, wherein at least a part of said opposite electrode is made of conductive polymer.

9. The method of manufacturing laminated capacitors as defined in claim 8, wherein said conductive polymer is selected from the group consisting of polypyrrole, polythiophene, and derivatives thereof.

10. The method of manufacturing laminated capacitors as defined in claim 8, wherein said conductive polymer is formed by chemical oxy-polymerization, and chemical oxy-polymerization and electro-polymerization.

11. The method of manufacturing laminated capacitors as defined in claim 1, wherein one of said conductor and said opposite electrode is one of a metal foil and a metal layer formed on a substrate.

12. The method of manufacturing laminated capacitors as defined in claim 11, wherein said metal layer is formed by one of vacuum process and plating.

* * * * *